(12) United States Patent
Green et al.

(10) Patent No.: US 12,265,056 B2
(45) Date of Patent: Apr. 1, 2025

(54) ION IDENTIFICATION USING ION MOBILITY SPECTROMETRY

(71) Applicant: Micromass UK Limited, Wilmslow (GB)

(72) Inventors: Martin Raymond Green, Bowdon (GB); Jason Lee Wildgoose, Stockport (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 18/040,572

(22) PCT Filed: Aug. 4, 2021

(86) PCT No.: PCT/GB2021/052008
§ 371 (c)(1),
(2) Date: Feb. 3, 2023

(87) PCT Pub. No.: WO2022/029424
PCT Pub. Date: Feb. 10, 2022

(65) Prior Publication Data
US 2023/0296561 A1 Sep. 21, 2023

(30) Foreign Application Priority Data
Aug. 4, 2020 (GB) ...................................... 2012094

(51) Int. Cl.
*G01N 27/62* (2021.01)
*G01N 27/622* (2021.01)
*H01J 49/26* (2006.01)

(52) U.S. Cl.
CPC ............ *G01N 27/622* (2013.01); *H01J 49/26* (2013.01)

(58) Field of Classification Search
CPC ...... G01N 27/622; G01N 27/623; H01J 49/26
See application file for complete search history.

(56) References Cited

U.S. PATENT DOCUMENTS

| | | | | |
|---|---|---|---|---|
| 11,756,775 B2 * | 9/2023 | Ujma | ................. | H01J 49/0045 250/287 |
| 2007/0176092 A1 * | 8/2007 | Miller | ................. | G01N 27/624 250/288 |

(Continued)

FOREIGN PATENT DOCUMENTS

| | | |
|---|---|---|
| GB | 2529012 A | 2/2016 |
| GB | 2533835 A | 7/2016 |
| GB | 2561378 A | 10/2018 |

OTHER PUBLICATIONS

Search Report for United Kingdom Patent Application No. GB2012094. 5, mailed Jun. 3, 2021.

(Continued)

*Primary Examiner* — Thang X Le
(74) *Attorney, Agent, or Firm* — Goodwin Procter LLP (57) ABSTRACT

A method of analysing ions is disclosed comprising: (i) subjecting ions of an analyte molecule to different activation levels at different times so as to cause the ions to have different mobilities at said different times, wherein the activation level is varied in a plurality of cycles, and wherein the activation level is varied between said different levels during each of the cycles. The method uses an ion mobility separator or scanned ion mobility filter to determine the mobilities of the ions for said different activation levels; and correlates the determined mobilities with their respective activation levels so as to thereby obtain a fingerprint for the analyte molecule.

17 Claims, 4 Drawing Sheets

(56) References Cited

U.S. PATENT DOCUMENTS

| | | | |
|---|---|---|---|
| 2013/0206974 A1* | 8/2013 | Brown | H01J 49/0031 |
| | | | 250/288 |
| 2017/0131238 A1 | 5/2017 | Giles et al. | |
| 2018/0166265 A1* | 6/2018 | Geromanos | H01J 49/0031 |
| 2019/0265195 A1* | 8/2019 | Park | H01J 49/0045 |

OTHER PUBLICATIONS

International Search Report and Written Opinion for International Patent Application No. PCT/GB2021/052008, mailed Oct. 21, 2021.
Combined Search and Examination Report for United Kingdom Patent Application No. GB2111245.3, mailed Jan. 20, 2022.
Migas, L. G., et al. "Origami: A software suite for activated ion mobility mass spectrometry (aIM-MS) applied to multimeric protein assemblies", International Journal of Mass Spectrometry, 427:20-28, Apr. 1, 2018.
Polasky, D. A., et al., "An Algorithm for Building Multi-State Classifiers Based on Collision-Induced Unfolding Data", Analytical Chemistry, 91:10407-10412, (2019).
Wikipedia, Bond-dissociation energy, Dec. 10, 2004, Retrieved from the Internet: URL:https://en.wikipedia.org/wiki/Bond-dissociation_energy, [retrieved on May 14, 2024].

\* cited by examiner

ION IDENTIFICATION USING ION MOBILITY SPECTROMETRY

CROSS-REFERENCE TO RELATED APPLICATIONS

This application is a U.S. national phase filing claiming the benefit of and priority to International Patent Application No. PCT/GB2021/052008, filed Aug. 4, 2021, which claims priority from and the benefit of United Kingdom patent application No. 2012094.5 filed on Aug. 4, 2020, the entire contents of which are incorporated herein by reference.

FIELD OF THE INVENTION

The present invention relates generally to ion mobility spectrometry and more specifically to the analysis of how the mobility of an analyte varies after being subjected to different activation levels.

BACKGROUND

Collision-induced unfolding (CIU) is a technique that may be used to distinguish between ions, such as protein ions, that have very similar structures. The technique involves collisionally activating an ion by colliding it with gas molecules so as to cause its structure to unfold, and then determining the ion mobility of that unfolded ion. The process is repeated, but when repeated the ion is collided with the gas molecules using different collision energies so as to cause different degrees of unfolding of the ion, and hence result in different respective ion mobilities being determined for that ion. A fingerprint of ion mobility as a function of collision energy can then be obtained for that ion. Different ions having very similar structures may have the same or similar ion mobility at a particular collision energy, particularly as the resolution of an ion mobility separator is relatively low. It can therefore be difficult to distinguish between two similar ions, such as conformational variations of the same protein, based on ion mobility. However, two such ions will have different mobility-collision energy fingerprints and so the CIU technique described above is useful for distinguishing between such ions.

SUMMARY

From a first aspect the present invention provides a method of analysing ions comprising: (i) subjecting ions of an analyte molecule to different activation levels at different times so as to cause the ions to have different mobilities at said different times, wherein the activation level is varied in a plurality of cycles, and wherein the activation level is varied between said different levels during each of the cycles; (ii) using an ion mobility separator or scanned ion mobility filter to determine the mobilities of the ions for said different activation levels; and (iii) correlating the determined mobilities with their respective activation levels so as to thereby obtain a fingerprint for the analyte molecule.

As the activation level is repeatedly cycled between the different activations levels, any given activation level is performed multiple times whilst analysing the analyte. As such, even if the intensity of the analyte ions varies with time, the method is able to obtain spectral data for the different activation levels at each intensity. The statistical precision of the spectral data obtained for the different activation levels can therefore be substantially the same.

The step of subjecting ions of an analyte molecule to different activation levels at different times may be performed on ions in the gaseous phase.

Embodiments of the invention relate to Collision-Induced-Unfolding (CIU) techniques, although other activation techniques for causing the analyte ions to unfold are contemplated.

The ion mobility separator may be an ion mobility separator in which ions are urged through a gas in the drift tube so that the ions separate according to their mobility through the gas. The ions may be urged through the device by a DC gradient and/or by repeatedly travelling a DC potential barrier along the device. Alternatively, a scanned ion mobility filter may be used, such as a Differential Mobility Separator (DMS), e.g. a FAIMS device. Such devices are scanned so as to transmit ions of different mobility at different times. This scanning may be performed by applying different voltages to the device at different times. The scanned ion mobility filter is scanned so as to transmit different mobilities during each occurrence of an activation level.

The different activation levels may cause the analyte ions to unfold and change conformation by different degrees, and so may change the collision cross-section of the analyte and hence its ion mobility and drift time through the ion mobility separator or exit time from the ion mobility filter.

The analyte may be a biomolecule, such as a protein.

The same sequence of activation levels may be performed in each cycle, i.e. the cycles may be duplicates of each other.

A single cycle of ion mobility separation may be performed after ions have been subjected to each activation level, or alternatively a plurality of ion mobility separation cycles may be performed after ions have been subjected to each activation level.

The method may comprise: using a first separator to separate different analyte molecules in a sample and then ionising the separated analyte molecules eluting from the first separator, and then performing said step of subjecting ions of an analyte molecule to said different activation levels at different times in said plurality of cycles; and/or using a second separator or filter to separate analyte ions according to a physicochemical property, and then performing said step of subjecting ions of an analyte molecule to said different activation levels at different times in said plurality of cycles.

Said step of ionising the separated analyte molecules eluting from the first separator may provide ions for each analyte that vary in intensity with time as a peak, and/or ions of each analyte may exit the second separator with an intensity that varies with time as a peak; and steps (i) to (iii) may be performed on the ions during at least part of the peak so as to determine a correlation between the ion mobilities of that analyte and the respective activation levels that it was subjected to.

The first separator may be a liquid chromatography (LC) separator, a gas chromatography (GC) separator, a size-exclusion chromatography (SEC) separator, an ion exchange chromatography (IEX) separator, or a capillary electrophoresis (CE) separator.

The second separator or filter may be a mass to charge ratio separator, a scanned mass to charge ratio filter, an ion mobility separator, or a scanned ion mobility filter.

For example, the scanned ion mobility filter may be a Differential Mobility Separator (DMS) such as a FAIMS device or any scanned mobility filter. The device may be scanned such that it (only) transmits ions of different mobility at different times. Similarly, if a scanned mass to charge ratio filter is used then the device may be scanned such that it (only) transmits ions of different mass to charge ratio at different times. In these scanning devices the scanning may be performed by varying the voltages that are applied to the device in the known manner.

The activation level may be varied in said plurality of cycles during each scan of the scanned mass to charge ratio filter or scanned ion mobility filter.

According to the methods described herein, a mass filter or ion mobility filter may be provided either upstream or downstream of the region in which the ions are activated so as to selectively transmit only ions having a selected range of mass to charge ratios or mobilities, respectively. The mass filter may be set so as to be capable of only transmitting ions of a fixed mass to charge ratio (or range of mass to charge ratios), for example, during said plurality of cycles. Similarly, if an ion mobility filter is used it may be set so as to be capable of only transmitting ions of a fixed mobility (or range of mobilities), for example, during said plurality of cycles.

The method may comprise: using said ion mobility separator or scanned ion mobility filter in step (ii) of claim 1 to separate the ions according to ion mobility after being subjected to each activation level in each cycle so as to obtain ion mobility spectral data for each activation level; summing the spectral data obtained for the same activation level in the plurality of cycles so as to obtain summed spectral data for each of the activation levels; determining the ion mobilities of the analyte for the different activation levels using the summed spectral data; and correlating these ion mobilities with their respective activation levels so as to produce a fingerprint of ion mobility as a function of activation level for the analyte.

Ions of each analyte may elute from the first or second separator as an elution peak having an intensity that varies with time, and the method may comprise summing only the spectral data obtained from ions in part of the elution peak; or the spectral data may be summed for only part of each separation cycle of the first separator or second separator.

The method may comprise normalising the intensity of the spectral data for each activation level by using the number of times that activation level was used when obtaining the summed spectral data.

The method may comprise performing said plurality of cycles x times for each analyte that elutes from the first or second separator, wherein x is selected from the group consisting of: ≥2; ≥3; ≥4; ≥5; ≥6; ≥7; ≥8; ≥9; ≥10; ≥15; ≥20; ≥25; ≥30; ≥35; ≥40; or ≥45.

The method may comprise performing each cycle in a timescale selected from: ≤15 s; ≤14 s; ≤13 s; ≤12 s; ≤11 s; ≤10 s; ≤9 s; ≤8 s; ≤7 s; ≤6 s; or 5 s.

There may be y of said different activation levels in each cycle, wherein y is selected from the group consisting of: ≥2; ≥3; ≥4; ≥5; ≥6; ≥7; ≥8; ≥9; or ≥10.

The ions may be activated by colliding them with gas molecules, wherein the ions are subjected to said different activation levels by colliding the ions with the gas molecules with different energies and/or for different durations of time.

Less preferably, the ions may be activated by other means such as photoactivation, and different frequencies and/or intensities of light may be used to perform the different levels of activation. Alternatively, the ions may be activated by being reacted with reagent ions or molecules of different concentrations or types of so as to perform the different levels of activation.

The method may further comprise mass analysing ions downstream of the ion mobility separator or scanned ion mobility filter recited in step (ii) of the first aspect of the invention so as to determine their mass to charge ratios.

The method may comprise selecting a mass to charge ratio and filtering spectral data obtained by the method so as to obtain correlated values of ion mobilities and respective activation levels for ions of that mass to charge ratio.

The method may comprise fragmenting or reacting ions downstream of said ion mobility separator or scanned ion mobility filter recited in step (ii) of claim 1 so as to form fragment or product ions; determining the mass to charge ratios of those fragment or product ions; and correlating the mass to charge ratios of the fragment or product ions with the activation levels used on their respective precursor ions.

This provides a fingerprint for a given type of analyte molecule that includes correlated values of ion mobilities and activation levels, as well as the types of fragment/product ions produced for each activation level.

The method may comprise determining the relative intensities of different fragment or product ions produced for each activation level and correlating these relative intensities with the respective activation levels.

Said fragmenting may be performed by collision induced dissociation.

However, other forms of fragmentation may be performed instead. For example, ions may be fragmented by electron capture dissociation, electron transfer dissociation or surface induced dissociation etc. Alternatively, the ions may be reacted with reagent ions or molecules according to any of the known techniques so as to produce the product ions.

The method may comprise identifying an analyte using the fingerprint.

The present invention also provides a method of screening a sample for an analyte of interest or for a particular analyte conformer of interest comprising: providing a first fingerprint of how the ion mobility of the analyte or conformer of interest varies after having been activated with different activation levels; performing the method described above on an analyte so as to obtain a second fingerprint for the analyte; comparing said first and second fingerprints to determine if they match; and wherein if it is determined that the fingerprints match then the analyte or conformer of interest is determined to be present.

The step of providing the first fingerprint may comprise performing the method described above on the analyte or conformer of interest so as to obtain the first fingerprint.

An embodiment of the invention comprises a method of identifying an analyte or the conformation of an analyte comprising: providing a database comprising known compounds or known conformers of the same compound, wherein each compound or conformer in the database is associated with a fingerprint of how its ion mobility varies after having been activated with different activation levels; performing the method described herein; comparing the determined fingerprint for the analyte molecule to the fingerprints in the database to determine if any match; and wherein if it is determined that the determined fingerprint matches a fingerprint in the database then the analyte molecule is identified as the compound or conformer in the database having the matching fingerprint.

For example, the method may be used to determine if a sample being analysed contains two different analytes/components (e.g. in a certain mass to charge ratio range). If the analytes/components are separated as described above (e.g. via LC), a clean fingerprint corresponding to a first analyte/component would be detected during a first part of the separation cycle, a clean fingerprint corresponding to a second different analyte/component would be detected during a second later part of the separation cycle, and a fingerprint corresponding to a mixture of the first and second analytes/components would be detected during a time between the first and second parts of the separation cycle. The method may therefore determine the fingerprints change over the separation cycle and used this to deconvolve the fingerprints for different analytes/components.

In the methods described above, the step of subjecting ions of an analyte molecule to different activation levels at different times may be performed on gaseous phase ions. However, it is also contemplated that the activation may be performed on the analyte whilst it is still in the liquid phase.

Accordingly, from a second aspect the present invention also provides a method of analysing ions comprising: (i) subjecting an analyte to activation and then ionising said analyte so as to form analyte ions, wherein the analyte is subjected to different activation levels at different times so that the ionisation produces analyte ions having different mobilities at different times, wherein the activation level is varied in a plurality of cycles, and wherein the activation level is varied between said different levels during each of the cycles; (ii) using an ion mobility separator or scanned ion mobility filter to determine the mobilities of the ions for said different activation levels; and (iii) correlating the determined mobilities with their respective activation levels so as to thereby obtain a fingerprint for the analyte molecule.

This method may include any of the features described above in relation to the first aspect, except wherein the activation is performed prior to ionisation.

The method may comprise using a first separator to separate different analytes in a liquid sample, wherein either: (a) said step of subjecting the analyte to activation is performed prior to separating the analytes in the first separator; or (b) steps (i) to (iii) are performed on each analyte that elutes from the first separator.

The first separator may be a liquid chromatography (LC) separator, a size-exclusion chromatography (SEC) separator, an ion exchange chromatography (IEX) separator, or a capillary electrophoresis (CE) separator.

The ions may be activated, for example, by changing the temperature of the sample solution that contains the analyte, e.g. between the first separator and an ionisation device. The sample solution may be heated to different temperatures so as to perform the different levels of activation, e.g. using a resistive heater or an electromagnetic heater such as an infra-red lamp or microwave heater. The sample solution may be cooled after heating. Alternatively, the activation may be performed by changing the pH level of the sample solution. For example, the pH of the sample solution may be varied so as to perform the different levels of activation by supplying an acid or alkali to the sample solution.

Alternatively, the activation may be caused by applying shear stress or mechanical vibration to the sample solution and the level of shear stress of mechanical vibration may be varied so as to vary the activation level. These techniques may be particularly useful when the analytes are proteins.

The first aspect of the present invention also provides an instrument for analysing ions comprising: a separator for providing ions of an analyte molecule with an intensity that varies with time; an activation region downstream of the separator for activating the ions so as to cause them to change ion mobility; an ion mobility separator or scanned ion mobility filter downstream of the activation region; and control circuitry arranged and configured to: (i) control the instrument so as to subject ions the analyte molecule to different activation levels at different times so as to cause the ions to have different mobilities at said different times, wherein the activation level is varied in a plurality of cycles, and wherein the activation level is varied between said different levels during each of the cycles; (ii) control the ion mobility separator or scanned ion mobility filter to determine the mobilities of the ions for said different activation levels; and (iii) correlate the determined mobilities with their respective activation levels so as to thereby obtain a fingerprint for the analyte molecule.

The instrument may be configured to perform any of the methods described herein in relation to the first aspect of the invention.

The second aspect of the present invention also provides an instrument for analysing ions comprising: an activation device for activating analyte; an ion source downstream of the activation device for ionising the analyte; an ion mobility separator or scanned ion mobility filter downstream of the ion source; and control circuitry arranged and configured to: (i) control the activation device so as to subject the analyte to activation and control the ion source to ionise said analyte so as to form analyte ions, wherein the activation device subjects the analyte to different activation levels at different times so that the ion source produces analyte ions having different mobilities at different times, wherein the activation level is varied in a plurality of cycles, and wherein the activation level is varied between said different levels during each of the cycles; (ii) control the ion mobility separator or scanned ion mobility filter to determine the mobilities of the ions for said different activation levels; and (iii) correlate the determined mobilities with their respective activation levels so as to thereby obtain a fingerprint for the analyte molecule.

Embodiments have been described in which the activation level is cycled between different values as an ion peak elutes from a separator in order to obtain a fingerprint having similar statistical precision for all activation levels. However, it is contemplated that other operational parameters of a mass or mobility spectrometer may be cycled between different values as an ion peak elutes from a separator in order to achieve similar statistical precision of the spectral data obtained at all values of the operational parameter.

Accordingly, from a third aspect the present invention also provides a method of analysing ions comprising: providing ions of an analyte molecule to a mass or mobility spectrometer with an intensity that varies with time as a peak; varying an operational parameter of the spectrometer with time such that ions in the peak are subjected to different conditions at different times, wherein the operational parameter is varied in a plurality of cycles, and wherein the operational parameter is varied between different values during each of the cycles; mass or mobility analysing the ions using the spectrometer so as to obtain spectral data for each of said different values of the operational parameter; and summing the spectral data obtained for the same value of the operational parameter in the plurality of cycles so as to obtain summed spectral data for each of the values of the operational parameter.

As the operational parameter is repeatedly cycled between the different values, any given value is performed multiple times whilst analysing the analyte. As such, even though the intensity of the analyte ions varies with time, the method is able to obtain spectral data for the different operational parameter values at each intensity. The statistical precision of the spectral data obtained for the different operational parameter values can therefore be substantially the same.

A separator may be used to provide the ions as a peak. The separator may separate different analyte molecules in a sample and these separated analyte molecules may then be ionised as they elute from the separator. For example, the separator may be a liquid chromatography (LC) separator, a gas chromatography (GC) separator, a size-exclusion chromatography (SEC) separator, an ion exchange chromatography (IEX) separator, or a capillary electrophoresis (CE) separator.

Alternatively, a separator may be used to separate analyte ions according to a physicochemical property and ions of each analyte may elute from the separator as a peak. For example, the separator may be a mass to charge ratio separator, mass filter, ion mobility separator or ion mobility filter.

The method may comprise summing only the spectral data obtained from ions in part of the peak.

The method may comprise normalising the intensity of the spectral data for each value of the operational parameter by the number of times that value was used when obtaining the summed spectral data.

The method described herein may be performed during a single experimental run.

The method may comprise performing said plurality of cycles x times over the peak, wherein x is selected from the group consisting of: $\geq 2$; $\geq 3$; $\geq 4$; $\geq 5$; $\geq 6$; $\geq 7$; $\geq 8$; $\geq 9$; $\geq 10$; $\geq 15$; $\geq 20$; $\geq 25$; $\geq 30$; $\geq 35$; $\geq 40$; or $\geq 45$.

The method may comprise performing each cycle in a timescale selected from: $\leq 15$ s; $\leq 14$ s; $\leq 13$ s; $\leq 12$ s; $\leq 11$ s; $\leq 10$ s; $\leq 9$ s; $\leq 8$ s; $\leq 7$ s; $\leq 6$ s; or 5 s.

There may be y of said different values of the operational parameter in each cycle, wherein y is selected from the group consisting of: $\geq 2$; $\geq 3$; $\geq 4$; $\geq 5$; $\geq 6$; $\geq 7$; $\geq 8$; $\geq 9$; or $\geq 10$.

Said mobility spectrometer may be a differential ion mobility spectrometer in which a time-varying electric field is applied so as to cause a time-averaged movement of the ions in a first direction and a static electric field is applied so as to urge ions in a direction opposite to the first direction, wherein said operational parameter that is varied with time is the magnitude of the static electric field.

The third aspect of the invention also provides an instrument for analysing ions comprising: a separator for providing ions of an analyte molecule with an intensity that varies with time; a mass or mobility spectrometer for determining the mass to charge ratio or mobility of the ions; and control circuitry arranged and configured to: (i) vary an operational parameter of the spectrometer with time such that ions in the peak are subjected to different conditions at different times, wherein the operational parameter is varied in a plurality of cycles, and wherein the operational parameter is varied between different values during each of the cycles; (ii) mass or mobility analyse the ions using the spectrometer so as to obtain spectral data for each of said different values of the operational parameter; and (iii) sum the spectral data obtained for the same value of the operational parameter in the plurality of cycles so as to obtain summed spectral data for each of the values of the operational parameter.

The instrument may be configured to perform any of the methods described herein in relation to the third aspect of the invention.

BRIEF DESCRIPTION OF THE DRAWINGS

Various embodiments will now be described, by way of example only, and with reference to the accompanying drawings in which.

DETAILED DESCRIPTION

Figure 1:
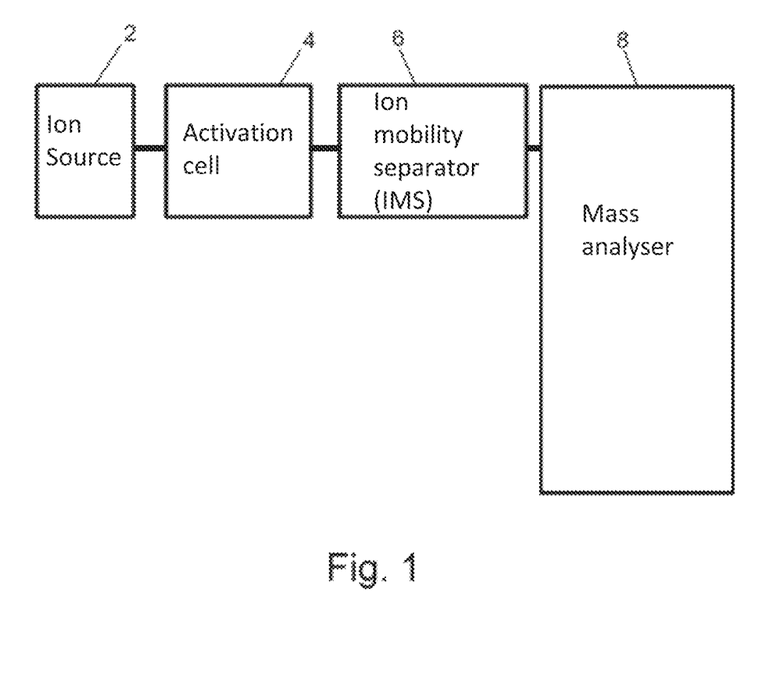
FIG. 1 shows a schematic of an embodiment of the present invention.

FIG. 1 shows a schematic of an embodiment of the present invention comprising an ion source 2, an activation cell 4 for activating ions, an ion mobility separator (IMS) 6, and a mass analyser 8.

In operation, ions are generated by ion source 2 and pass to the activation cell 4. The ions are activated within the activation cell 4 so as to alter the structure of the ion. For example, this may cause the ion structure to unfold or otherwise change shape. The ions may be activated by accelerating them axially into, or within, the activation cell 4 such that they collide with background gas molecules therein. The ions may be accelerated in this manner by applying voltages to the instrument so as to generate a potential difference. Alternatively, or additionally, the ions may be activated by causing them to oscillate radially within the activation cell 4 such that they collide with the background gas therein. This may be achieved, for example, by applying AC voltages to electrodes of the activation cell 4 so as to cause the ions to oscillate. The activation cell 4 may comprise an ion guide and the ions may pass through the ion guide and be activated without being axially trapped therein, or the activation cell 4 may comprise an ion trapping device that axially traps the ions whilst they are activated. The ion guide or ion trapping device may be formed from an ion tunnel or multipole rod set.

It is contemplated that alternative or additional forms of activation may be used, such as supplying reagent molecules or ions to the analyte ions to activate the analyte ions and/or photoactivating the analyte ions by directing photons at them.

The ions are transmitted from the activation cell 4 towards the IMS device 6. The IMS device 6 may comprise an ion accumulation region that accumulates ions and periodically pulses them into a separation region having a background gas therein in order to separate the ions according to their ion mobility through the background gas. Alternatively, a separate accumulation device (not shown) may be provided upstream of the IMS device 6 for accumulating ions and periodically pulsing them into the IMS device 6 having the background gas therein. The IMS device may be a drift tube IMS device in which a static DC gradient urges the ions through the background gas present in the separation region so as to cause the ions to separate according to their mobility. Alternatively, the IMS device 6 may be a travelling wave IMS device in which one or more DC potential barrier is repeatedly travelled along the separation region of the IMS device 6 so as to urge ions through the background gas therein at different rates depending on the ion mobilities of the ions through that gas (e.g. as described in U.S. Pat. No. 6,791,078, which is incorporated herein).

It is contemplated that activation of the ions may be performed in the accumulation region or accumulation device that is associated with the IMS device 6, rather than in an upstream region.

The ions that elute from the IMS device 6 may be detected at an ion detector. The ion mobility of any given ion may then be determined from the duration of time that it takes that ion to travel through the separation region of the IMS device 6. As such, the duration of time that it takes an ion to travel through the separation region of the IMS device 6 may be determined from the time that elapses between ions being pulsed into the separation region of the IMS device 6 and being subsequently detected at the detector. It is contemplated that ions may elute from the IMS device 6 into a mass analyser 8, such as a time of flight (TOF) mass analyser, and be mass analysed. The mass to charge ratios of the ions are therefore able to be detected as well as determining the ion mobilities of the ions using the detector of the mass analyser. The data recorded by the mass analyser may therefore be filtered according to mass to charge ratio so as to obtain ion mobility spectral data that is specific to any given mass to charge ratio. This allows the ion mobilities of multiple different ions to be analysed by the instrument at once.

In embodiments in which the mass analyser 8 is a TOF mass analyser, the extraction region of the TOF mass analyser may intermittently push ions into the time of flight region towards the detector at a rate such that it performs a plurality of mass analyses for each separation cycle of the IMS device 6, i.e. a plurality of times between adjacent pulses of ions into the separation region of the IMS device 6. This enables the different elution times of the ions from the IMS device 6 to be detected. The flight times of the ions from the extraction region of the TOF mass analyser to its detector may also be recorded and used to determine the mass to charge ratios of the ions in the normal manner.

Although the mass analyser 8 has been described as being a TOF mass analyser, it may alternatively be another type of mass analyser. For example, the mass analyser 8 may be a scanned quadrupole mass analyser having a quadrupole rod set mass filter followed by an ion detector.

In order to perform a CIU experiment, a first analysis of the ions is performed as described above, whilst using a first level of ion activation in the activation cell 4. A second analysis of the ions is also performed as described above, but using a different level of ion activation in the activation cell 4 so as cause a given ion to be activated by a different degree to that in the first analysis. For example, the ion may be caused to unfold or otherwise change shape by a greater degree in the second analysis than in the first analysis. At least a third analysis may be performed as described above, but using at least a third different level of ion activation in the activation cell 4. Any number of such analyses may be performed, each having a different level of ion activation in the activation cell 4.

As described above, the ions may be activated according to any of the known techniques. Where the ions are activated by colliding them with background gas molecules, for example, the different levels of ion activation in the activation cell 4 may be performed by providing different rates of acceleration through the background gas (e.g. by using different DC potential gradients, or different frequencies and/or amplitudes of AC voltage). Alternatively, or additionally, the different levels of ion activation in the activation cell 4 may be performed by accelerating the ions through the background gas for different durations. Where the activation is photoactivation, different frequencies and/or intensities of light may be used to perform the different levels of ion activation. Similarly, where the ions are reacted with reagent ions or molecules then different concentrations or types of reagent ions or molecules may be used to perform the different levels of ion activation.

The different levels of ion activation may cause a given ion to unfold or change shape by different degrees, in at least some of these different levels of activation. This in turn has an effect on the ion mobility of that ion and hence on its ion mobility through the IMS device 6. The technique disclosed herein is therefore able to determine how the ion mobility of an ion varies as a function of the level of activation of that ion so as to provide a fingerprint for that ion. Although it has conventionally been difficult to distinguish between different ions having very similar structures using one particular activation level, particularly as the resolution of an ion mobility separator is relatively low, the technique described herein provides a fingerprint of ion mobility over a range of different activation levels. The different ions will have different fingerprints and so can be more easily distinguished according to the CIU technique described herein.

For example, the technique described herein may be used to identify or distinguish between analytes such as biomolecules. The technique is particularly applicable to the analysis of protein molecules, e.g. to identify or distinguish between conformational variations of the same protein. The techniques described herein are particularly suitable for use in drug discovery, biotherapeutic characterisation, or screening for a compound of interest.

For example, fingerprints of ion mobility as a function of activation level may be determined for various known reference ions (standards) in order to generate a classification database. An analytical sample may then be analysed according to the experiment herein to determine such fingerprints for the analyte ions. The resulting fingerprints may then be compared to those in the database in order determine if any of them match, resulting in an identification of the analyte ion if its fingerprints matches a fingerprint in the database. Alternatively, the experimental data may be screened for an ion of interest by comparing a known fingerprint for the ion of interest with the fingerprints of the experimentally analysed ions in order to determine if any of them match the known fingerprint. If the known fingerprint matches a fingerprint for an analysed ion then it is determined that the analyte of interest is present in the sample.

Embodiments of the invention may also be used to determine information about any given analyte ion. For example, the above described CIU analysis may be performed on an analyte ion after it has been subjected to different conditions and the fingerprints for those respective conditions may then be compared with each other in order to determine information about the ion, such its structure. Examples of the conditions that may be varied include varying the degree of binding of another molecule to the analyte or varying the heat applied to the analyte etc.

Other embodiments of the invention involve performing the above described CIU analysis on an analyte (e.g. a protein) multiple times after it has been exposed to multiple different conditions. For example, the multiple conditions that the analyte is exposed to may be exposing the analyte to multiple different temperatures or intensities of light, or storing the analyte for multiple different durations of time. The different CIU fingerprints obtained for these multiple different conditions may then be used to detect the analyte in subsequent samples that are subjected to the CIU analysis. For example, the CIU fingerprints obtained under the multiple different conditions may be used to screen subsequently analysed samples for changes to the analyte that may have occurred by being exposed to the different conditions. This may be performed as part of a quality control process, e.g. to check that the analyte has the same CIU fingerprint in each of the subsequently analysed samples, or more generally to determine if the analyte has degraded or changed.

Figure 2A:
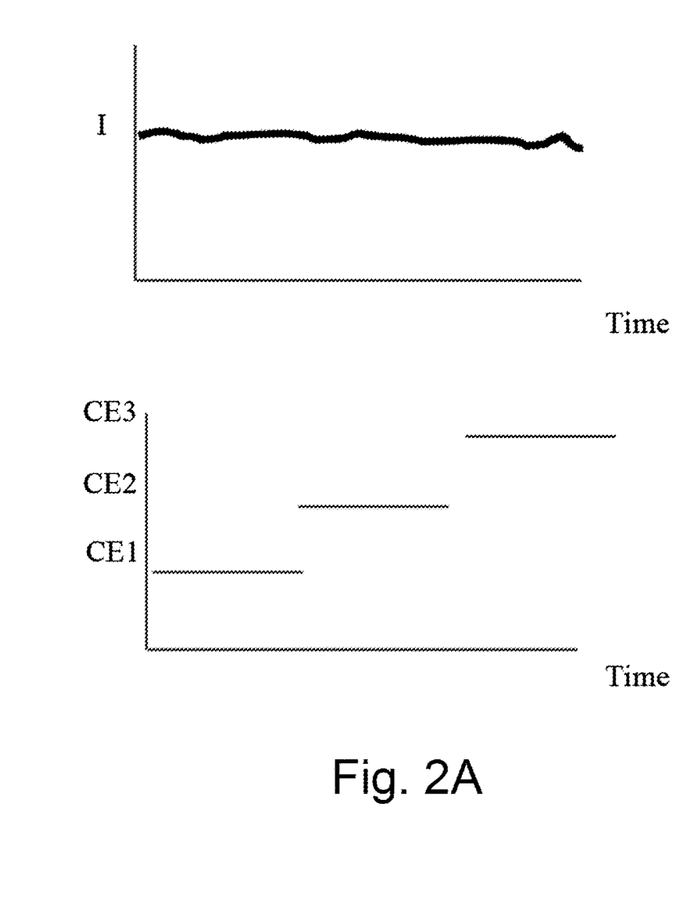
FIGS. 2A-2B show known CIU techniques.
Figure 2B:
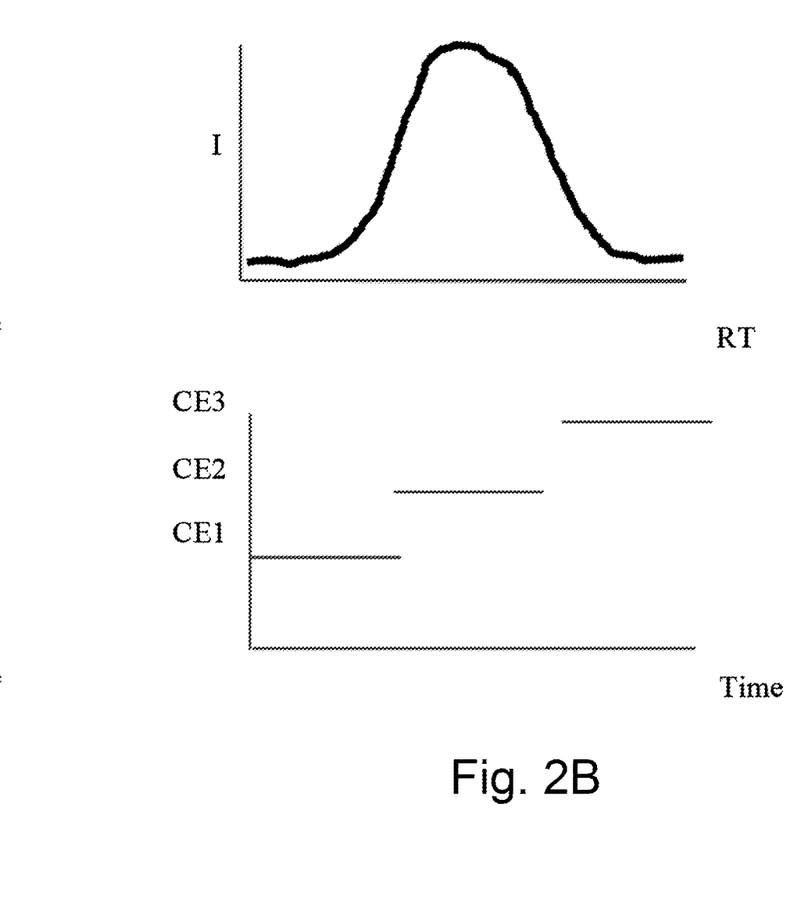

CIU techniques are known in which ion mobility spectra are obtained for ions that have been subjected to different collision energies. The collision energies are stepped over time whilst the ions are transmitted towards the IMS device such that IMS spectra are recorded for the different collision energies, thereby producing a two-dimensional mobility verses collision energy fingerprint that is reflective of the unfolding of a protein in the gas phase. FIGS. 2A and 2B show examples of such known techniques.

FIG. 2A shows a known technique in which the analyte is infused with a substantially constant intensity (shown by the upper graph), whilst the collision energy is stepped up to different values as time progresses (shown by the lower graph). The ion mobilities of the ions are determined after the analyte has been activated according to the collision energies shown (CE1,CE2,CE3). More specifically, for each level of collision energy, ions are repeatedly pulsed into the IMS device and hence multiple ion mobility spectra are summed for each collision energy until enough statistical precision has been achieved for a robust classification of the analyte.

It is desirable to use chromatographic introduction techniques (such as SEC, IEX, CE or LC) for biotherapeutics in conjunction with CIU in order to improve the quality of the spectra obtained (sample clean-up) and to allow automation. FIG. 2B shows an example of such a known technique.

FIG. 2B shows a known technique in which an analyte elutes from a chromatographic separator with an intensity profile that varies with time as a peak (shown by the upper graph). As with FIG. 2A, the collision energy is stepped up to different values as time progresses (shown by the lower graph in FIG. 2B) and the ion mobilities of the ions are determined. More specifically, for each level of collision energy, ions are repeatedly pulsed into the IMS device and hence multiple ion mobility spectra are summed for each collision energy. However, as the intensity of the analyte eluting from the separator varies with time, the statistical precision of the IMS spectral data obtained for the different collision energy values varies.

In contrast to such conventional techniques, embodiments of the present invention repeatedly vary the activation level, across a range of activation levels, a plurality of times as an analyte elutes from an upstream separator device.

Figure 3A:
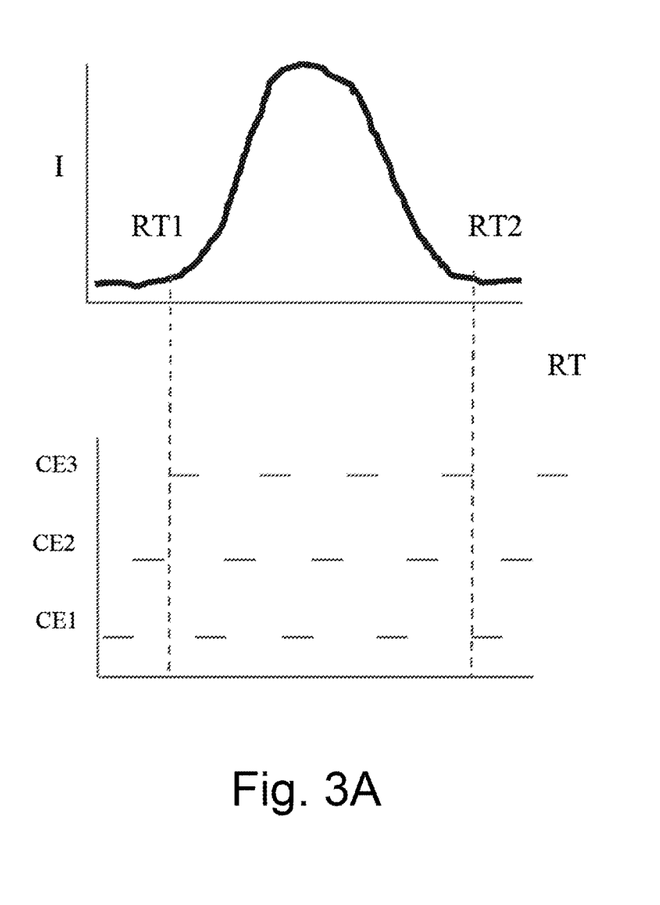
FIG. 3A shows a CIU technique according to an embodiment of the present invention.

FIG. 3A shows an example according to an embodiment of the present invention in which the ion source 2 comprises a separator for separating analytes prior to ionisation, such as comprising a SEC, IEX, CE or LC separator. However, it is alternatively, or additionally contemplated that the sample may be ionised and then the analytes separated according to a physicochemical property. After separation, the analytes are activated as described above. As shown by the upper graph in FIG. 3A, the intensity/of the analyte varies as a function of retention time RT in the separator and has the form of a peak. The lower graph in FIG. 3A represents the collision energy with which the analyte is activated, as a function of time. In the example shown, the collision energy is repeatedly cycled between three different collision energies CE1,CE2,CE3 during the period that the analyte elutes from the separator so as to activate the ions. As described above, the activated ions then pass to the IMS device 6 in order that their ion mobilities are determined. For each level of collision energy in each cycle, ions may be pulsed into the separation region of the IMS device only once so as to perform only a single IMS separation cycle. Alternatively, for each level of collision energy in each cycle, ions may be pulsed into the separation region of the IMS device multiple times so as to obtain multiple ion mobility spectra. In both cases, the ion mobility spectra obtained for the same collision energy in the multiple different cycles that occur over the elution of the peak may be summed. For the example shown, the ion mobility spectra obtained using collision energy CE1 in all five of the cycles may be summed. Similarly, the ion mobility spectra obtained using collision energy CE2 in all five of the cycles may be summed, and the ion mobility spectra obtained using collision energy CE3 in all five of the cycles may be summed. Alternatively, only the ion mobility spectra obtained for the same collision energy in the multiple different cycles that occur over a certain range (or ranges) of elution times of the peak may be summed. For example, referring again to FIG. 3A, the ion mobility spectra obtained using collision energy CE1 between retention times RT1 and RT2 may be summed. Similarly, the ion mobility spectra obtained using collision energy CE2 between retention times RT1 and RT2 may be summed, and the ion mobility spectra obtained using collision energy CE3 between retention times RT1 and RT2 may be summed. The values of RT1 and RT2 may be selected so as to encompass only the duration during which the analyte ion signal intensity varies significantly (e.g. above a threshold value). Alternatively, the range may be a predetermined range or may be automatically selected in a data-dependent manner, i.e. based on the ion signal detected.

Acquiring data by cycling the collision energy in this way ensures that the intensity, and therefore statistical precision, of the data is similar for each collision energy value, regardless of the elution profile of the chromatographic peak. For example, it is apparent from FIG. 2B that in the conventional approach the collision energy is changed relatively few times as the ion peak elutes from the separator and so the signal intensity for the ion is significantly different for collision energy value CE2 as compared to values CE1 and CE3. As such, the statistical precision of the data for these collision energy values will be significantly different. In contrast, it is apparent from FIG. 3A that in embodiments of the present invention the collision energy is changed relatively rapidly as the ion peak elutes from the separator and so the ions are exposed to all of the collision energies over a relatively short range of retention times of the separator. As such, the ion signal intensity (and hence statistical precision) is substantially the same for the spectral data obtained at each collision energy value in each cycle.

The IMS data, for each collision energy value, obtained from the multiple cycles may be summed after the data acquisition has finished or in real time. The intensity of the summed data for each collision energy value may be normalised according to the number of times that the collision energy was at that value when acquiring the data. For example, referring again to FIG. 3A, if data is only summed for the duration between retention times RT1 and RT2 then three sets of data will be summed for collision energy value CE1, three sets of data will be summed for collision energy value CE2, but four sets of data will be summed for collision energy value CE3. The data for collision energy CE3 may therefore be normalised to the data for each of collision energies CE1 and CE2 by multiplication of its intensity by ¾. The data may then be used to correlate how the ion mobility of an analyte varies as a function of collision energy.

Figure 3B:
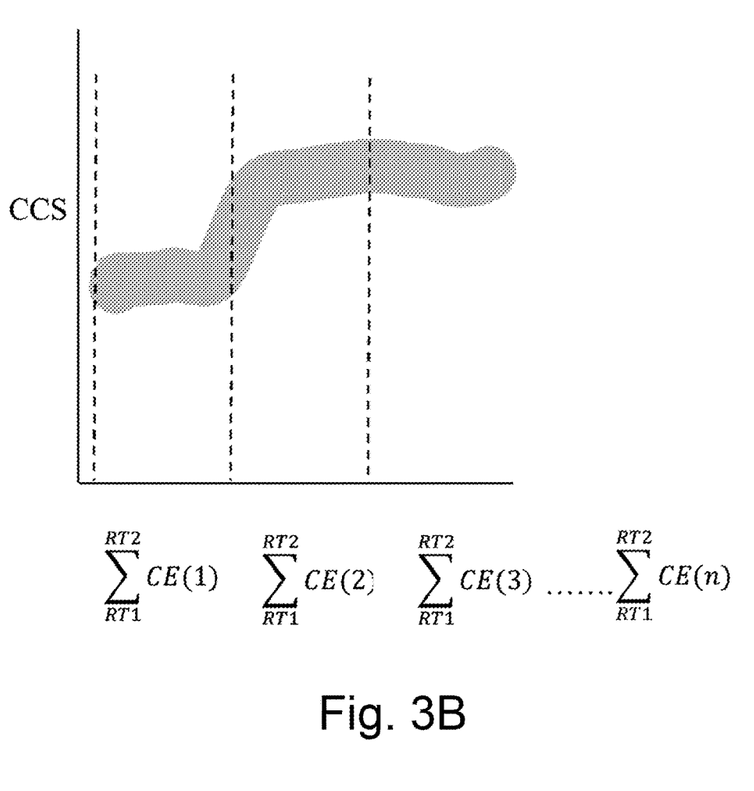
FIG. 3B shows a mobility-collision energy fingerprint for an analyte analysed according to FIG. 3A.

FIG. 3B shows a representation of a plot of ion mobility as a function of collision energy for an analyte ion that has been analysed according to FIG. 3A. The left vertical dashed line represents the collision energy value CE1, the central vertical dashed line represents the collision energy value CE2, and the right vertical dashed line represents the collision energy value CE3. In this example the ion mobility values for the ion would only be determined for these three collision energies CE1,CE2,CE3. However, as described below, each cycle may include more than three collision energy values such that a more detailed fingerprint of ion mobility and collision energy can be obtained for the ion.

FIG. 3A shows five collision energy cycles being performed as the analyte peak elutes from the separator, during each of which the collision energy is stepped between three different values. However, it is contemplated that any number of such cycles (greater than one) may be performed, although a relatively high number of cycles is desired. Additionally, or alternatively, it is contemplated that the collision energy may be stepped between any number of values (greater than one) during each cycle, although a relatively high number of cycles is desired. For example, the collision energy may be stepped between 40 different values in each cycle, wherein multiple ion mobility separations are performed for each collision energy step such that IMS spectral data is obtained over 0.1 seconds for each step. This results in a cycle taking 4 seconds. However, in the limit only a single ion mobility separation may be performed at each collision energy step and, for example, if the ion mobility separation takes 20 milliseconds then the cycle time of the 40 steps will take only 0.8 seconds.

Figure 4:
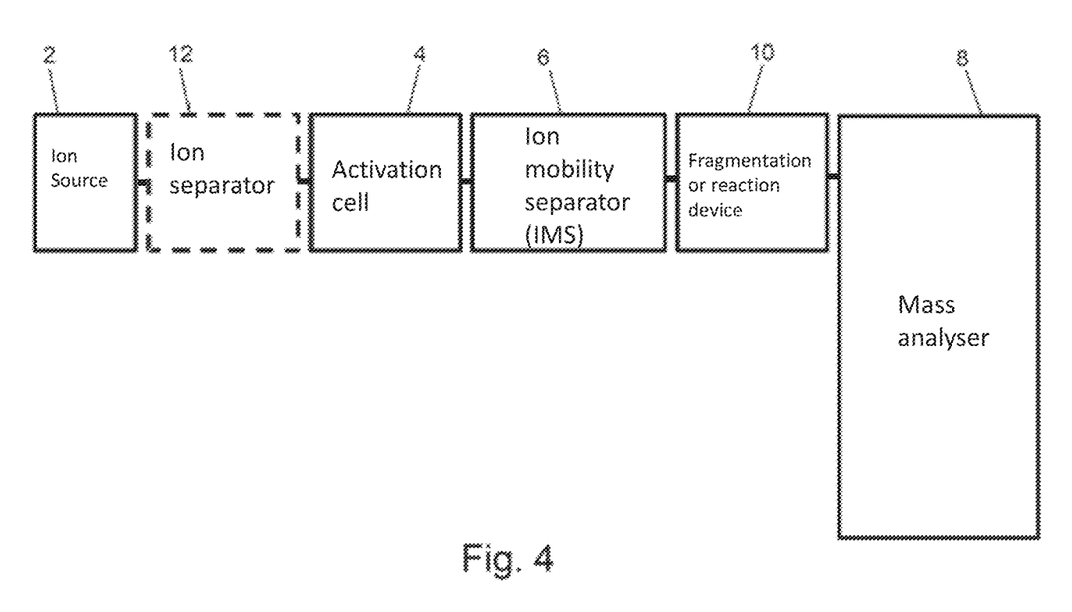
FIG. 4 shows a schematic of another embodiment of the present invention.

FIG. 4 shows another embodiment that is the same as that described above, except that the ions are fragmented or reacted by a fragmentation or reaction device 10 so as to produce fragment or product ions downstream of the IMS device 6. The fragment or product ions, and any of their remaining precursor ions, are then detected and/or mass analysed downstream in the same manner as described above with respect to FIG. 1. The ions may be fragmented in any one of the known manners, such as collision induced dissociation, electron capture dissociation, electron transfer dissociation or surface induced dissociation etc. Similarly, the ions may be reacted with reagent ions or molecules according to any of the known techniques so as to produce the product ions.

According to such embodiments, the time at which the fragment or product ions are detected represents the time it takes their precursor ions to travel through the IMS device 6. Accordingly, the spectral data obtained again enables a fingerprint of ion mobility as a function of activation level (that occurred prior to the IMS device 6) to be obtained for each precursor ion. However, the fragmentation or reaction of ions downstream of the IMS device 6 enables fragment/product ions to be generated that may be specific to the conformation of ion that elutes from the IMS device 6, or may generate fragment/product ions at intensities that are specific to the conformation of ion that elutes from the IMS device 6. For example, a precursor ion that has been subjected to a first activation level upstream of the IMS device 6 may produce a first set of fragment/product ions downstream of the IMS device 6, whereas the same precursor ion that has been subjected to a second, different activation level upstream of the IMS device 6 may produce a second, different set of fragment/product ions downstream of the IMS device 6 (i.e. at least some of the fragment/product ions are different types). Alternatively, or additionally, a precursor ion that has been subjected to a first activation level upstream of the IMS device 6 may produce fragment/product ions downstream of the IMS device 6 having first relative intensities, whereas the same precursor ion that has been subjected to a second, different activation level upstream of the IMS device 6 may produce fragment/product ions downstream of the IMS device 6 having second, different relative intensities.

The mass analyser 8 detects the mass to charge ratios of the fragment/product ions and correlates this data with the drift times through the IMS device 6 of their respective precursor ions. The fragment/product ion data may therefore be added to the fingerprint for each analyte ion, such that the fingerprint includes both ion mobility data and fragment/product ion data that may vary as a function of activation level. This additional level of detail in the fingerprint may help characterise an ion using the CIU technique.

As shown in FIG. 4, an ion separator 12 may be provided between the ion source 2 and activation cell 4 for separating ions according to a physicochemical property, such as mass to charge ratio or ion mobility. The ion separator may be a filter that selectively transmits only certain ions at any given time and filters out and discards other ions, and which varies the ions that it transmits with time. For example, the ion separator 12 may be a mass to charge ratio filter (e.g. quadrupole rod set mass filter) or a differential mobility analyser. Alternatively, the ion separator 12 may separate ions without discarding them, such as a mass selective ion trap or an ion mobility separator of the type described herein above. It will be appreciated that the ion mobility separator 12 may also be provided in the embodiments that do not have the fragmentation/reaction cell 10.

Although the present invention has been described with reference to preferred embodiments, it will be understood by those skilled in the art that various changes in form and detail may be made without departing from the scope of the invention as set forth in the accompanying claims.

Embodiments have been described in which the collision energy is stepped between a plurality of different progressively increasing values in each cycle, with the collision energy being held at each value before being stepped to the next value. However, it is contemplated that the collision energy may alternatively be stepped between a plurality of different progressively decreasing values in each cycle. Alternatively, the collision energy may be stepped up and then down during each cycle, or step down and then up during each cycle. It is also contemplated that the collision energy may be continuously and progressively scanned throughout each cycle, rather than being stepped and held at each step. The collision energy may be varied in each cycle in a linear manner, a non-linear manner, a saw tooth pattern, or a pseudo-random pattern. Each spectrum may have meta data associated to allow the collision energy value to be determined at any point.

Although specific embodiments have been described in which the collision energy is varied, as described above the ions may be activated by means other than colliding the ions with gas molecules and these other means of activation may be used in the embodiments described.

It is also contemplated that the analyte may be activated in the liquid phase, rather than in the gaseous phase. For example, the analyte may be activated whilst in the sample solution and prior to ionisation. This activation may be performed by changing the temperature of the sample solution, e.g. between the LC separator and ionisation device. For example, the sample solution may be heated to different temperatures so as to perform the different levels of activation, e.g. using a resistive heater or an electromagnetic heater such as an infra-red lamp or microwave heater. The sample solution may be cooled after heating. Alternatively, the activation may be performed by changing the pH level of the sample solution, e.g. between the LC separator and ionisation device. For example, the pH of the sample solution may be varied so as to perform the different levels of activation by supplying an acid or alkali to the sample solution. Alternatively, the activation may be caused by applying shear stress or mechanical vibration to the sample solution and the level of shear stress of mechanical vibration may be varied so as to vary the activation level. These techniques may be particularly useful when the analytes are proteins.

Data may be summed using a moving RT window (e.g. based on knowledge of typical peak widths) so as to produce a file containing a series of CIU fingerprints vs separator RT. This may produce CIU fingerprints for different analytes that elute from the separator at different times. Ions of a single charge state may be selected, e.g. by using a mass filter upstream of the IMS device (or by using a reconstructed mass chromatogram). A CIU plot (ion mobility vs activation level) may be obtained at multiple retention times of the separator. Each CIU plot may be spaced apart in retention time by the time taken to perform a single cycle of the different activation levels. The embodiment described above in relation to FIG. 3A-3B involved identifying a peak and summing up the data between RT1 and RT2 for each activation level so as to produce a single CIU fingerprint (FIG. 3B). However, rather than identifying a peak before summing, the process may instead involve automatically moving the RT window over which the data is summed. For example, assuming that the RT range over which a peak is expected to elute corresponds to the retention time over which x CIU plots are obtained, then the data (for each activation level) for the nth to (n+x)th CIU plot are summed so as to generate a first summed CIU plot. The summing window is then moved so as to sum the data (for each activation level) for the (n+1)th CIU plot to the (n+1+x)th CIU plot so as to generate a second summed CIU plot. This process is repeated multiple times, but where each time the upper and lower limits of the summing window are moved along by one CIU plot such that a new summed CIU plot is formed. This process provides statistically good CIU plots over the RT range that a peak is expected to elute over. This data can then be interrogated in a targeted or non-targeted manner. For example, several different variants of the same protein may be discovered, or it may be determined that the CIU plots change over the separator peaks indicating interference such as a shoulder on a peak with a different pattern.

Embodiments have been described in which the activation level is cycled between different values as the ion peak elutes from a separator in order to obtain a fingerprint having good statistical precision for all activation levels. However, it is contemplated that other operational parameters of a mass or mobility spectrometer may be cycled between different values as an ion peak elutes from a separator in order to achieve good statistical precision of the spectral data obtained at all values of the operational parameter. For example, a differential ion mobility spectrometer (DIMS) may be provided downstream of the separator (e.g. LC device) and a parameter of the DIMS device, such as the magnitude of the compensation voltage, may be cyclically varied as a peak elutes from the separator. The spectral data obtained for each value of the operational parameter (e.g. for each magnitude of the compensation voltage) may then be summed, enabling spectral data of similar precisions to be obtained for each value of the operational parameter.

Alternatively, an energy resolved mass spectrometer (ERMS) may be provided downstream of the separator and the activation energy of the ERMS device may be cyclically varied as a peak elutes from the separator. The spectral data obtained for each activation energy may then be summed, enabling spectral data of similar precisions to be obtained for each activation energy.

The invention claimed is:

1. A method of analysing ions comprising:
    using a first separator to separate different analyte molecules in a sample and then ionising the separated analyte molecules eluting from the first separator, and/or using a second separator or filter to separate analyte ions according to a physicochemical property; and subsequently
    (i) subjecting ions of an analyte molecule to different activation levels at different times so as to cause the ions to have different mobilities at said different times, wherein the activation level is varied in a plurality of cycles, and wherein the activation level is varied between said different levels during each of the cycles;
    (ii) using an ion mobility separator or scanned ion mobility filter to determine the mobilities of the ions for said different activation levels; and
    (iii) correlating the determined mobilities with their respective activation levels so as to thereby obtain a fingerprint for the analyte molecule;
    wherein the method comprises:
    using said ion mobility separator or scanned ion mobility filter in step (ii) to separate the ions according to ion mobility after being subjected to each activation level in each cycle so as to obtain ion mobility spectral data for each activation level;
    summing the spectral data obtained for the same activation level in the plurality of cycles so as to obtain summed spectral data for each of the activation levels;
    determining the ion mobilities of the analyte for the different activation levels using the summed spectral data; and
    correlating these ion mobilities with their respective activation levels so as to produce a fingerprint of ion mobility as a function of activation level for the analyte.

2. The method of claim 1, wherein said step of ionising the separated analyte molecules eluting from the first separator provides ions for each analyte that vary in intensity with time as a peak, and/or wherein ions of each analyte exit the second separator with an intensity that varies with time as a peak; and wherein steps (i) to (iii) are performed on the ions during at least part of the peak so as to determine a correlation between the ion mobilities of that analyte and the respective activation levels that it was subjected to.

3. The method of claim 1, wherein the second separator or filter is a mass to charge ratio separator, a scanned mass to charge ratio filter, an ion mobility separator, or a scanned ion mobility filter.

4. The method of claim 1, wherein ions of each analyte elute from the first or second separator as an elution peak having an intensity that varies with time, and the method comprises summing only the spectral data obtained from ions in part of the elution peak; or wherein the spectral data is summed for only part of each separation cycle of the first separator or second separator.

5. The method of claim 1, comprising normalising the intensity of the spectral data for each activation level by using the number of times that activation level was used when obtaining the summed spectral data.

6. The method of claim 1, comprising performing said plurality of cycles x times for each analyte that elutes from the first or second separator, wherein x is selected from the group consisting of: $\geq 2$; $\geq 3$; $\geq 4$; $\geq 5$; $\geq 6$; $\geq 7$; $\geq 8$; $\geq 9$; $\geq 10$; $\geq 15$; $\geq 20$; $\geq 25$; $\geq 30$; $\geq 35$; $\geq 40$; or $\geq 45$.

7. The method of claim 1, wherein there are y of said different activation levels in each cycle, and wherein y is selected from the group consisting of: $\geq 2$; $\geq 3$; $\geq 4$; $\geq 5$; $\geq 6$; $\geq 7$; $\geq 8$; $\geq 9$; or $\geq 10$.

8. The method of claim 1, wherein the ions are activated by colliding them with gas molecules, and the ions are subjected to said different activation levels by colliding the ions with the gas molecules with different energies and/or for different durations of time.

9. The method of claim 8, comprising selecting a mass to charge ratio and filtering spectral data obtained by the method so as to obtain correlated values of ion mobilities and respective activation levels for ions of that mass to charge ratio.

10. The method of claim 1, further comprising mass analysing ions downstream of the ion mobility separator or scanned ion mobility filter recited in step (ii) of claim 1 so as to determine their mass to charge ratios.

11. The method of claim 1, further comprising fragmenting or reacting ions downstream of said ion mobility separator or scanned ion mobility filter recited in step (ii) of claim 1 so as to form fragment or product ions; determining the mass to charge ratios of those fragment or product ions; and correlating the mass to charge ratios of the fragment or product ions with the activation levels used on their respective precursor ions.

12. The method of claim 11, comprising determining the relative intensities of different fragment or product ions produced for each activation level and correlating these relative intensities with the respective activation levels.

13. The method of claim 11, wherein said fragmenting is performed by collision induced dissociation.

14. A method of screening a sample for an analyte of interest or for a particular analyte conformer of interest comprising:
providing a first fingerprint of how the ion mobility of the analyte or conformer of interest varies after having been activated with different activation levels; performing the method of claim 1 on an analyte so as to obtain a second fingerprint for the analyte;
comparing said first and second fingerprints to determine if they match; and
wherein if it is determined that the fingerprints match then the analyte or conformer of interest is determined to be present.

15. A method of analysing ions comprising:
(i) using a first separator to separate different analytes in a liquid sample;
(ii) subjecting an analyte to activation and then ionising said analyte so as to form analyte ions, wherein the analyte is subjected to different activation levels at different times so that the ionisation produces analyte ions having different mobilities at different times, wherein the activation level is varied in a plurality of cycles, and wherein the activation level is varied between said different levels during each of the cycles;
(iii) using an ion mobility separator or scanned ion mobility filter to determine the mobilities of the ions for said different activation levels; and
(iv) correlating the determined mobilities with their respective activation levels so as to thereby obtain a fingerprint for the analyte molecule;
wherein-said step of subjecting the analyte to activation is performed prior to separating the analytes in the first separator; or steps (ii) to (iv) are performed on each analyte that elutes from the first separator; and
wherein the method comprises:
using said ion mobility separator or scanned ion mobility filter in step (iii) to separate the ions according to ion mobility after being subjected to each activation level in each cycle so as to obtain ion mobility spectral data for each activation level;
summing the spectral data obtained for the same activation level in the plurality of cycles so as to obtain summed spectral data for each of the activation levels;
determining the ion mobilities of the analyte for the different activation levels using the summed spectral data; and
correlating these ion mobilities with their respective activation levels so as to produce a fingerprint of ion mobility as a function of activation level for the analyte.

16. An instrument for performing the method of claim 15 comprising:
a first separator for separating analytes in a liquid sample;
an activation device for activating analyte;
an ion source downstream of the activation device for ionising the analyte;
an ion mobility separator or scanned ion mobility filter downstream of the ion source; and
control circuitry arranged and configured to:
(i) control the first separator to separate different analytes in a liquid sample;
(ii) control the activation device so as to subject the analyte to activation and control the ion source to ionise said analyte so as to form analyte ions, wherein the activation device subjects the analyte to different activation levels at different times so that the ion source produces analyte ions having different mobilities at different times, wherein the activation level is varied in a plurality of cycles, and wherein the activation level is varied between said different levels during each of the cycles;
(iii) control the ion mobility separator or scanned ion mobility filter to determine the mobilities of the ions for said different activation levels; and
(iv) correlate the determined mobilities with their respective activation levels so as to thereby obtain a fingerprint for the analyte molecule;
wherein said step of subjecting the analyte to activation is performed prior to separating the analytes in the first separator; or steps (ii) to (iv) are performed on each analyte that elutes from the first separator;
wherein the control circuitry is arranged and configured to:
control the said ion mobility separator or scanned ion mobility filter in step (ii) to separate the ions according to ion mobility after being subjected to each activation level in each cycle so as to obtain ion mobility spectral data for each activation level;
sum the spectral data obtained for the same activation level in the plurality of cycles so as to obtain summed spectral data for each of the activation levels;
determine the ion mobilities of the analyte for the different activation levels using the summed spectral data; and
correlate these ion mobilities with their respective activation levels so as to produce a fingerprint of ion mobility as a function of activation level for the analyte.

17. An instrument for analysing ions comprising:
a separator for providing ions of an analyte molecule with an intensity that varies with time;
an activation region downstream of the separator for activating the ions so as to cause them to change ion mobility;

an ion mobility separator or scanned ion mobility filter downstream of the activation region; and control circuitry arranged and configured to:

(i) control the instrument so as to subject ions the analyte molecule to different activation levels at different times so as to cause the ions to have different mobilities at said different times, wherein the activation level is varied in a plurality of cycles, and wherein the activation level is varied between said different levels during each of the cycles;

(ii) control the ion mobility separator or scanned ion mobility filter to determine the mobilities of the ions for said different activation levels; and (iii) correlate the determined mobilities with their respective activation levels so as to thereby obtain a fingerprint for the analyte molecule; and wherein the control circuitry is arranged and configured to:

control the said ion mobility separator or scanned ion mobility filter in step (ii) to separate the ions according to ion mobility after being subjected to each activation level in each cycle so as to obtain ion mobility spectral data for each activation level;

sum the spectral data obtained for the same activation level in the plurality of cycles so as to obtain summed spectral data for each of the activation levels;

determine the ion mobilities of the analyte for the different activation levels using the summed spectral data; and correlate these ion mobilities with their respective activation levels so as to produce a fingerprint of ion mobility as a function of activation level for the analyte.

\* \* \* \* \*